United States Patent
Heijl et al.

(10) Patent No.: US 11,459,424 B2
(45) Date of Patent: Oct. 4, 2022

(54) METHOD FOR PRODUCING POLYCARBONATE

(71) Applicant: Covestro Deutschland AG, Leverkusen (DE)

(72) Inventors: Jan Heijl, Lokeren (DE); Rolf Bachmann, Bergisch Gladbach (DE); Volker Michele, Cologne (DE); Felix Cock, Wilrijk (BE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 187 days.

(21) Appl. No.: 16/766,102

(22) PCT Filed: Dec. 12, 2018

(86) PCT No.: PCT/EP2018/084552
§ 371 (c)(1),
(2) Date: May 21, 2020

(87) PCT Pub. No.: WO2019/121236
PCT Pub. Date: Jun. 27, 2019

(65) Prior Publication Data
US 2021/0371585 A1  Dec. 2, 2021

(30) Foreign Application Priority Data
Dec. 20, 2017 (EP) .................. 17209190

(51) Int. Cl.
C08G 64/14 (2006.01)
C08G 64/20 (2006.01)
C08G 64/24 (2006.01)

(52) U.S. Cl.
CPC ......... *C08G 64/205* (2013.01); *C08G 64/14* (2013.01); *C08G 64/24* (2013.01)

(58) Field of Classification Search
USPC ............. 528/196, 198, 271, 272, 274
See application file for complete search history.

(56) References Cited

FOREIGN PATENT DOCUMENTS

| EP | 0517044 A2 | 12/1992 | |
| EP | 0520272 A2 | 12/1992 | |
| EP | 1219589 A1 * | 2/2002 | ............. C07C 68/02 |
| EP | 2098553 A1 | 9/2009 | |

OTHER PUBLICATIONS

EP1219589A1 machine translation—Continuous process for preparing diaryl esters of carbonic acid Andreas Dr. Chrisochoou et al. (Year: 2003).*
International Search Report for International Patent Application No. PCT/EP2018/084552, dated Mar. 20, 2019.
Written Opinion for International Patent Application No. PCT/EP2018/084552, dated Mar. 20, 2019.

* cited by examiner

*Primary Examiner* — Terressa Boykin
(74) *Attorney, Agent, or Firm* — K&L Gates LLP

(57) ABSTRACT

A process for preparing polycarbonate by the phase interface process in the presence of at least one catalyst, wherein immediately after the optionally first addition of the at least one catalyst, from 0.01 to 20 J/kg of mixing energy is introduced into the system comprising the at least one catalyst within a time of from 2 to 1200 s. A mixture, an organic phase, and a process for distributing at least one catalyst in a system comprising an organic phase and an aqueous phase are also disclosed herein.

15 Claims, No Drawings

METHOD FOR PRODUCING POLYCARBONATE

CROSS-REFERENCE TO RELATED APPLICATIONS

This application is a U.S. national stage application, filed under 35 U.S.C. § 371, of International Application No. PCT/EP2018/084552, which was filed on Dec. 12, 2018, and which claims priority to European Patent Application No. 17209190.2, which was filed on Dec. 20, 2017. The contents of each are incorporated by reference into this specification.

FIELD

The present invention relates to a process for the efficient preparation of polycarbonate by the method of the phase interface process in the presence of at least one catalyst, wherein a small quantity of mixing energy is introduced into the system immediately after addition of the catalyst.

BACKGROUND

The preparation of polycarbonate by the phase interface process has been described by Schnell, "Chemistry and Physics of Polycarbonates", Polymer Reviews, Volume 9, Interscience Publishers, New York, London, Sydney 1964, pp. 33-70; D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980)"; pp. 75-90, D. Freitag, U. Grigo, P. R. Müller, N. Nouverne', BAYER AG, "Polycarbonates" in Encyclopedia of Polymer Science and Engineering, Volume 1 1, Second Edition, 1988, pp. 651-692 and finally by Dres U. Grigo, K Kircher and P R-Müller "Polycarbonate" in Becker/Braun, Kunststoff-Handbuch, Volume 3/1, Polycarbonate, Polyacetale, Polyester, Celluloseester, Crul Hanser Verlag Munich, Vienna 1992, pp. 118-145.

Furthermore, the phase interface process for preparing polycarbonate is also described, for example, in EP-A 0517044.

In general, the phosgenation of a disodium salt of a bisphenol or a mixture of various bisphenols present in aqueous-alkaline solution or suspension is carried out in the presence of an inert organic solvent or solvent mixture which forms a second organic phase in addition to the aqueous phase. The oligocarbonates formed, which are mainly present in the organic phase, are condensed by means of suitable catalysts to give high molecular weight polycarbonates dissolved in the organic phase, with the molecular weight being able to be controlled by means of suitable chain terminators (e.g. monofunctional phenols). The organic phase is finally separated off and the polycarbonate is isolated therefrom by means of various treatment steps.

The condensation is customarily carried out in an inert solvent in the presence of alkali and a catalyst in the interface.

The required mass transfer at the interface of the two phases is carried out by appropriate mixing. In general, this is effected by the introduction of high dispersion energy associated with high shear gradients. Thus, for example, it is emphasized in EP-A 0520272 that it can be advantageous to mix the catalyst intensively into the emulsion present by means of suitable mixing devices. The examples of EP-A 2 098 553 also support this teaching. Here, a helically coiled tube reactor having a metering position for the catalyst at the beginning of the reactor is used. At a pressure drop of about 5 bar over this helically coiled reactor, a mixing energy of about 500 J/kg is introduced into the system after addition of the catalyst. A similar experimental setup is described in WO 2015/110447 A1. Here too, a helically coiled tube reactor having a metering position for the catalyst at the beginning of the reactor is used.

However, the high shear gradients generally result in poor separation of the phases in subsequent purification processes. This is associated with increased water contents in the organic phase or increased residual monomer contents or chain terminator contents in the wastewater.

Optimizations of the process, which are effected by improving the mixing and adhering to a narrow temperature and pH profile and also isolation of the product, are described in EP1219589 A1, EP1216981 A2, EP1216982 A2 and EP784048 A1. Here, the reaction mixture is, after addition of the catalyst, frequently conveyed through a tube provided with constrictions and is thereby continually mixed and dispersed. For example, it is stated in EP1219589 in Example 1 that the reaction mixture is conveyed through a tube having a plurality of constrictions, with a total mixing energy of about 602 J/kg being expended.

Particularly on addition of the catalyst, undesirable secondary reactions occur. The addition of the catalyst brings about a strong acceleration of the reaction. Unreacted (residual) monomers or phenolic components can remain in the two phases when the reaction is not carried out in an ideal manner.

Before the addition of catalyst, chain terminators are generally also added to the mixture. The addition of the catalyst normally occurs at the end of the reaction when only small amounts of BPA are still present. An undesirable incorporation of nitrogen by the catalyst can be minimized thereby.

However, especially in respect of the preparation of high-purity polycarbonate, for example for optical applications, it is necessary to prevent possible contamination as far as possible. In addition, it is also desirable for the wastewater streams to be polluted to a very small extent and thus have to be subjected to very little purification in order to combine economics with an environmentally friendly process procedure.

SUMMARY

It was therefore an object of the present invention to provide a process for preparing polycarbonate by the phase interface process, in which at least one disadvantage of the prior art is improved. In particular, it was an object of the present invention to provide a process for preparing polycarbonate by the phase interface process in which the concentration of unreacted residual monomers in the wastewater stream and/or the organic phase and/or the polycarbonate is very low. Thus, it was, inter alia, an object to achieve very complete conversion in the main reaction. Likewise, it was desirable for residues of the phenolic components in the aqueous phase preferably to be minimized at the same time. In addition, it was desirable to be able to ensure good separation of the emulsion into organic and aqueous phases in subsequent steps of the process.

At least one, preferably all, of the abovementioned objects have been achieved by the present invention. It has surprisingly been found that, in the region of the addition of catalyst, a reduction in the energy input into the system combined with homogeneous mixing-in of the catalyst leads to the decrease according to the invention of the phenolic components in the aqueous phase. At the same time, the emulsion could be separated into two phases again very well.

It is known that a rapid reaction at the interface between two phases requires very good mass transfer to the phase boundary and away from the phase boundary. For this reason, established approaches to a solution provide for high dispersing energy to be introduced in the region of the addition of catalyst in order to ensure this mass transfer as a result of intensive mixing. In addition, the phase microstructure and the phase boundary being formed are influenced by simultaneously high shear gradients.

In the process of the invention, it has surprisingly been found that, contrary to this established procedure, homogeneous mixing of the catalyst using a comparatively low mixing energy and at the same time low shear rates leads to a higher selectivity of the reaction. The process additionally offers the advantage that the emulsion is more readily separable in the following steps and ultimately a decrease in undesirable components (e.g. (residual) monomer and/or phenolic components) is also obtained both in the aqueous phase and in the organic phase. This results firstly in a significantly lower outlay for the work-up of the aqueous and organic phases and of the polycarbonate produced. Secondly, this also means that the starting materials used are reacted more completely and this higher yield results in a decreased loss of starting materials (for example phosgene and bisphenol A) (increased selectivity).

The present invention accordingly provides a process for preparing polycarbonate by the phase interface process in the presence of at least one catalyst, which is characterized in that, immediately after the optionally first addition of the at least one catalyst, from 0.01 to 20 J/kg of mixing energy is introduced into the system containing at least one catalyst within a time of from 2 to 1200 s.

DETAILED DESCRIPTION

In the context of the present invention, the introduction of mixing energy in a range from 0.01 to 20 J/kg means that there is little mixing of the phases with one another. This means that a mixing energy of greater than 0 J/kg is always introduced. The introduction of from 0.01 to 20 J/kg of mixing energy preferably means that homogenization takes place. This particularly preferably occurs without simultaneous dispersion. A person skilled in the art would be able to convert J/kg into W/m$^3$ on the basis of the density of a PC solution at 25° C. of 1.22 g/cm$^3$. The terms homogenization and dispersion are known to those skilled in the art. The term "homogenization" preferably means that a state in which the concentrations of the individual components of the composition are essentially the same within any volume element of the aqueous phase or the organic phase is sought, preferably maintained. Here, the term "essentially" preferably means a deviation in the concentration of the individual components of the composition in any volume element of not more than 5%, preferably not more than 3% and particularly preferably not more than 1%. Furthermore, preference is given to the phase interface between the aqueous phase and the organic phase being very small. Likewise, the term "dispersion" preferably means the formation of an emulsion composed of the aqueous phase and the organic phase, with the aqueous and organic phases being able to additionally contain the further components for the preparation of the polycarbonate. Examples of such an emulsion are the oil-in-water emulsion or the water-in-oil emulsion. This emulsion is preferably stable. This means that it does not visibly demix over a period of at least 30 minutes. Thus, homogenization is preferably distinguished from dispersion by there being no concentration gradient of any dissolved substance within one of the phases and a very small phase interface being present between the phases in the case of homogenization. According to the invention, a mixing energy which is greater than 20 J/kg is preferably a dispersing energy.

The mixing energy is particularly preferably from 0.4 to 20 J/kg, more preferably from 2 to 10 J/kg and in particular preferably from 4 to 6 J/kg.

A person skilled in the art will be able to calculate a corresponding shear rate when a reactor is specified.

According to the invention, the mixing energies indicated are averages. This means that higher values or lower values of the mixing energy are preferably not ruled out. These can optionally also occur only briefly. According to the invention, the averages are preferably formed over an entire reactor system. For this reason, the mixing energy at respective boundary zones or else internals is included in the calculation.

According to the invention, it has been found that the size of the phase interface which results from the low mixing energy is firstly advantageous for the later separation of the aqueous and organic phases. At the same time, it has also been found that such separation is even simpler as a result of the concentration of unreacted monomer being kept low by means of the process of the invention. It is known that bisphenol A in particular, which represents the standard monomer in the preparation of polycarbonate, can act as emulsifier. In this sense, it stabilizes the emulsion composed of aqueous and organic phases. As a result of an increased selectivity combined with increased conversion of the monomer being achieved according to the invention, less monomer is available, which stabilizes the emulsion. This leads to simplified separation of the aqueous and organic phases. According to the invention, this also means, inter alia, a reduced concentration of aqueous droplets in the organic phase and/or of organic droplets in the aqueous phase.

The low mixing energy according to the invention is introduced immediately after the optionally first addition of the catalyst. Here, the term "immediately" preferably means that the corresponding reactor is configured so that, in a continuous system, the catalyst is added in such a way that the mixing energy is introduced into the catalyst-containing volume element within not more than 1 second. This means that, according to the invention, a connection of the catalyst introduction position with a reactor, which achieves the mixing energies according to the invention, via a very short pipe is not ruled out. In the case of a batch system, this preferably means that the catalyst is introduced into a system which has already been supplied with mixing energy, with the volume element which contains the catalyst being subjected to this mixing energy within not more than 1 second.

The formulation according to the invention "after the optionally first addition of the at least one catalyst" preferably means that there can be a plurality of additions of a catalyst which take place at different times. This means, for example, that in a continuous process there are a number of places in the process at which a catalyst can be introduced. In a batch process, the addition can take place at different points in time. In the case of the different additions of the catalyst, the same catalyst and/or mixtures of catalysts or else a different catalyst and/or mixtures of catalysts are added in each addition. In any case, the first addition is always the addition when the catalyst is introduced into the system for the very first time. According to the invention, the introduction of the low mixing energy takes place at this point. However, a mixing energy of from 0.01 to 20 J/kg can preferably be introduced immediately after each addition of at least one catalyst.

The process of the invention preferably encompasses only one addition of at least one catalyst. Particular preference is given here to there being only one catalyst.

The at least one catalyst used according to the invention can be selected from the group consisting of tertiary amines such as triethylamine, tributylamine, trioctylamine, N-alkylpiperidines (N-ethylpiperidine, N-methylpiperidine or N-i/n-propylpiperidine) and an organophosphine. The at least one catalyst is particularly preferably triethylamine and/or ethylpiperidine.

The optionally first addition of the at least one catalyst can be carried out before the phosgenation but preferably after the introduction of phosgene. The introduction of the catalyst or catalysts can be carried out neat, in an inert solvent, preferably the or one of the organic phase(s) in the polycarbonate synthesis, or else as aqueous solution. When tertiary amines are used as catalyst, they can, for example, be introduced in aqueous solution as their ammonium salts with acids, preferably mineral acids, in particular hydrochloric acid. When a plurality of catalysts is used or partial amounts of the total amount of catalyst are introduced, different methods of introduction can also be employed at different places or at different times. The total amount of the catalysts used is in the range from 0.0001 to 1.0 mol %, preferably from 0.001 to 0.2 mol %, based on moles of monophenols used. The process of the invention is preferably characterized in that the at least one catalyst is added in the form of a solution in the case of the optionally first addition. Here, a solution is preferably a homogeneous mixture of the at least one catalyst in at least one solvent. The catalyst is particularly preferably dissolved in methylene chloride, chlorobenzene or a mixture of the two. Preference is here given to a mixture composed of from 2 to 10% based on the solvent. It has been found to be advantageous for the at least one catalyst to be added in the form of a solution because the distribution of the catalyst in the system is made better thereby and the effect according to the invention can thus be achieved even better.

It has been found to be advantageous for the temperature immediately after the optionally first addition of the at least one catalyst to be from 35 to 45° C. In this way, the incorporation of nitrogen brought about by the catalyst can be reduced.

The low mixing energy according to the invention is introduced within a time of from 2 to 1200 s, particularly preferably from 60 to 700 s.

The mixing energy is preferably introduced into the catalyst-containing system by means of at least one static mixer and/or at least one dynamic mixer. If more than one static mixer and/or dynamic mixer is used, these can be connected in series.

In a preferred embodiment, from 0.01 to 20 J/kg, particularly preferably from 0.4 to 20 J/kg, are introduced into the catalyst-containing system over a time of from 1 to 100 s, particularly preferably from 2 to 25 s, by means of at least one static mixer.

In a likewise preferred embodiment, from 0.01 to 20 J/kg, particularly preferably from 0.4 to 20 J/kg, are introduced into the catalyst-containing system over a time of from 60 to 1200 s, particularly preferably from 120 to 700 s, by means of at least one dynamic mixer. The dynamic mixer is preferably a stirred vessel.

According to the invention, it has to be ensured that a high shear rate immediately after addition of the at least one catalyst is avoided. As mentioned above, a person skilled in the art will be able to calculate a shear rate for a given reactor system.

As static mixers, it is possible to use all types known to a person skilled in the art. Preference is given to both turbulence-based systems such as bladed ring mixers and also to systems which function in the laminar region, e.g. helical or comb-like crossed or honeycomb grid-like meandering structures or else microstructured mixers. Excessively high shear stresses can be avoided very readily in the case of static mixers by selection of mixer geometry, flow rate and pressure drop. The appropriate selection lies within the knowledge and skill of a person skilled in the art. An extreme example of a static mixer having a very low shear stress can also be an empty tube through which turbulent flow occurs.

The dynamic mixer is preferably selected from the group consisting of a stirred vessel and a pump. When a stirred vessel is used, the shear stress can be limited by the choice of stirrer geometry, baffling and speed of rotation of the stirrer, as is known to a person skilled in the art; for example propeller stirrers can be used in a system having two baffles. However, other stirrer geometries such as inclined-blade stirrers or disc stirrers can also be used. Pumps can also function as dynamic mixers; for example in the case of centrifugal pumps, the shear stress can be influenced by selection of circumferential velocity of the pump rotor and gap width between rotor and housing.

According to the invention, the process is preferably operated continuously. The effect of the present invention can advantageously be implemented in a simple way in existing continuous plants. These frequently have dispersers for introducing the catalyst into the system, in which the solution is pumped through small holes of an orifice plate so that very small droplets are formed. The effect of the present invention can be realized in a simple way in existing plants by simply enlarging these holes to reduce the mixing energy.

Furthermore, the process of the invention is preferably characterized in that the process comprises the steps (a) production of a mixture of an organic phase and an aqueous phase, where the organic phase contains at least phosgene and optionally at least one chain terminator and the aqueous phase contains at least one dihydroxydiarylalkane, alkali metal hydroxide and optionally at least one chain terminator, (b) reaction of the phosgene with the at least one dihydroxydiarylalkane in the mixture obtained from (a), optionally with addition of at least one chain terminator and/or further alkali metal hydroxide and (c) at least one addition of at least one catalyst, where step (c) is carried out before step (a) and/or after step (b).

The dispersing of the two phases (aqueous and organic phases) in step (a) can preferably be realized by means of installed tube orifices, static mixers, dispersers and/or, for example, pumps. The reaction is preferably carried out in plug flow with little backmixing. This can thus occur, for example, in tube reactors.

When the organic phase is dispersed in the aqueous phase or the aqueous phase is dispersed in the organic phase by means of a disperser, it is possible for an oil-in-water dispersion or a water-in-oil dispersion to be produced, with the term oil referring to the organic phase. An oil-in-water dispersion is preferably produced in the dispersing step. The organic phase is preferably dispersed continuously in the aqueous phase by means of the disperser.

An oil-in-water dispersion is by definition a dispersion in which water forms the outer (continuous) phase and oil forms the inner (dispersed) phase, i.e. oil droplets are dispersed in water. A water-in-oil dispersion is consequently a dispersion in which oil forms the outer phase and water forms the inner phase.

The organic phase comprises one or more solvents.

Suitable solvents are aromatic and/or aliphatic chlorinated hydrocarbons, preferably dichloromethane, trichloroethylene, 1,1,1-trichloroethane, 1,1,2-trichloroethane and chlorobenzene and mixtures thereof. However, it is also possible to use aromatic hydrocarbons such as benzene, toluene, m-/p-/o-xylene or aromatic ethers such as anisole either alone, in admixture or in addition to or in admixture with chlorinated hydrocarbons, with preference being given to dichloromethane and chlorobenzene and mixtures thereof. Another embodiment of the process of the invention uses solvents which do not dissolve but only partly swell polycarbonate. It is therefore also possible to use nonsolvents for polycarbonate in combination with solvents. In that case, solvents which are soluble in the aqueous phase, e.g. tetrahydrofuran, 1,3- or 1,4-dioxane or 1,3-dioxolane, can also be used as solvent when the solvent partner forms the second organic phase.

The organic phase of step (a) comprises not only the at least one solvent but also at least phosgene and optionally at least one chain terminator.

The organic phase comprises all or part of the required phosgene before production of the mixture. The organic phase preferably contains the total phosgene required including the phosgene excess used before production of the mixture. The introduction of the phosgene into the organic phase can be effected in gaseous form or in liquid form. The excess of phosgene used in step (a) over the at least one dihydroxydiarylalkane is preferably from 3 to 20 mol %, particularly preferably from 5 to 18 mol % and very particularly preferably from 7.5 to 15.0 mol %.

To regulate the molecular weight, the addition of one or more monofunctional chain terminator(s) such as phenol or alkylphenols, in particular phenol, p-tert-butylphenol, isooctylphenol, cumylphenol, their chlorocarbonic esters or acid chlorides of monocarboxylic acids or mixtures of these chain terminators, to the organic phase may be necessary in step (a). However, such chain terminators can also be added at any point in time during the synthesis as long as phosgene or chlorocarbonic acid end groups are still present in the reaction mixture or in the case of the acid chlorides and chlorocarbonic esters as chain terminators as long as sufficient phenolic end groups of the polymer being formed are available. For example, at least one chain terminator can also be added in step (b).

The chain terminator or terminators is/are preferably added immediately before step (c). This is preferably effected at a place or a point in time at which there is no longer any phosgene present but the at least one catalyst has not yet been introduced, i.e. they can be introduced before the at least one catalyst, together with the at least one catalyst or in parallel thereto. The chain terminator(s) can be introduced as a melt, in an alkaline aqueous solution or in a solution in the organic solvent used for the reaction. The solution of the chain terminator(s) is preferably in the organic solvent used, as a result of which the chain terminator(s) is/are introduced into the organic phase in the vicinity of the reactive acid chloride end groups.

In a particularly preferred embodiment of the process of the invention, phenol is used as chain terminator. The phenol is preferably used before step (c) in the form of a solution comprising at least one organic solvent and the phenol in a concentration of from 5 to 40% by weight, preferably from 10 to 25% by weight. In this embodiment, the aqueous phase is preferably set to a pH of from 11.3 to 11.6 at the end of the reaction (i.e. in step (b)). The addition of the phenol and the setting of the pH to from 11.3 to 11.6 are preferably carried out before addition of the catalyst.

The aqueous phase of step (a) comprises at least one dihydroxydiarylalkane, alkali metal hydroxide and optionally at least one chain terminator.

Suitable dihydroxydiarylalkanes are preferably those of the general formula (I),

$$HO-Z-OH \qquad (I)$$

where Z is a divalent organic radical which has from 6 to 30 carbon atoms and contains one or more aromatic groups. Examples of such compounds which can be used in the process of the invention are dihydroxydiarylalkanes such as hydroquinone, resorcinol, dihydroxybiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and also alkylated, ring-alkylated and ring-halogenated compounds thereof. Preferred dihydroxydiarylalkanes are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane (bisphenol A (BPA)), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexyne and 1,1-bis(4-hydroxyphenyl)-3,3,5-trimethylcyclohexane (bisphenol TMC).

Particularly preferred dihydroxydiarylalkanes are 4,4'-dihydroxybiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

For the purposes of the present invention, alkali metal hydroxide is preferably sodium hydroxide, potassium hydroxide or mixtures thereof, particularly preferably sodium hydroxide.

Likewise, at least one of the above-described chain terminators can also be present in the aqueous phase of step (a).

The aqueous phase of step (a) preferably comprises from 1 to 30% by weight, particularly preferably from 3 to 25% by weight, very particularly preferably from 8 to 17% by weight, of dihydroxydiarylalkane based on the total weight of the aqueous phase, where the concentration of this aqueous solution in respect of the sum of the dihydroxydiarylalkanes is calculated not as alkali metal salt but as free dihydroxydiarylalkane.

In step (b) of the process of the invention, the phosgene is reacted with the at least one dihydroxydiarylalkane in the mixture obtained from step (a), optionally with addition of at least one chain terminator and/or further alkali metal hydroxide.

In this step, too, the above-described chain terminators and/or above-described alkali metal hydroxide can preferably be added.

According to the invention, a reaction of the phosgene with the at least one dihydroxydiarylalkane can take place as early as in step (a), so that the steps (a) and (b) cannot readily be separated from one another in time. Nevertheless, step (a) always takes place before step (b) in terms of time. In one embodiment, step (b) can, despite overlapping with step (a), nevertheless be carried out longer, so that subsequently only step (b) takes place (without further overlapping with step (a)).

In step (a) and/or step (b), one or more branching agents or branching agent mixtures can optionally be added to the synthesis. However, such branching agents are usually added before the chain terminator(s). For example, trisphenols, quaternary phenols, acid chlorides of tricarboxylic or tetracarboxylic acids or else mixtures of the polyphenols or the acid chlorides are used as branching agents.

Examples of branching compounds having three or more than three phenolic hydroxyl groups are phloroglucine, 4,6-dimethyl-2,4,6-tri(4-hydroxyphenyl)heptene-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxyphenyl)methane.

Examples of other trifunctional compounds suitable as branching agents are 2,4-dihydroxybenzoic acid, trimesic acid, cyanuric chloride and 3,3-bis(3-methyl-4-hydroxyphenyl)-2-oxo-2,3-dihydroindole. Particularly preferred branching agents are 3,3-bis(3-methyl-4-hydroxyphenyl)-2-oxo-2,3-dihydroindole and 1,1,1-tri(4-hydroxyphenyl)-ethane.

During step (b), formation of oligocarbonates occurs. According to the piror art, this is carried out, for example, in a pumped circulation reactor; see, for example, EP 1 249463A1, US 2004/0158026A1, U.S. Pat. No. 6,613,868 B2. In this pumped circulation reactor, mixing of the introduced phosgene with likewise introduced disodium salt of at least one dihydroxydiarylalkane, preferably bisphenol A (step (a)), and the first oligomerization steps (step (b)) can take place. Chloroformate groups formed react with phenoxide end groups present to form growing oligomers which contain different end groups (phenoxide or chloroformate or mixed species of the two). An emulsion of aqueous and organic phases is formed by introduction of sufficient mixing or dispersing energy. The monomer inherently present in the mixture, preferably BPA, additionally acts as emulsifier here.

Step (b) is carried out in an alkali medium. This step is an exothermic reaction. According to the invention, it is preferably carried out in a temperature range from −5° C. to 100° C., particularly preferably from 15° C. to 80° C., very particularly preferably from 25° C. to 65° C.; depending on the solvent or solvent mixture, it may be necessary to work under superatmospheric pressure. The reaction can be carried out at different pressures, depending on the reactor used. For example, the reaction can preferably be carried out at a pressure of from 0.5 to 20 bar (absolute).

At least one addition of at least one catalyst takes place in step (c) according to the invention. As indicated above, a plurality of additions of respectively the same or different catalysts or catalyst mixtures can be carried out. Here, step (c) occurs before step (a) and/or after step (b). In one embodiment in which step (a) overlaps with step (b), step (a) nevertheless always takes place before step (b) in terms of time, so that the time sequence of step (c) can be unambiguously determined.

When step (c) takes place before step (a), preference is given to the at least one catalyst being part of the organic phase.

Particular preference is given to step (c) taking place after step (b), particularly preferably immediately after step (b).

According to the invention, a "system containing at least one catalyst" is sometimes spoken of. This system can differ depending on the point in time of addition of the at least one catalyst. If, for example, the at least one catalyst is added before step (a), the system has a different composition than when it is added after step (b), since there are not yet any oligocarbonates present before step (a) but they are present after step (b). A person skilled in the art can thus determine this system on the basis of the point in time of addition. The "system containing at least one catalyst" is particularly preferably the reaction mixture as results from the step (b) according to the invention.

Furthermore, preference is given to the process of the invention being characterized in that the step (c1) in which a mixing energy of from >0.01 to 20 J/kg is introduced over a time of from 2 to not more than 1200 s is followed by a further step (c2) in which from 50 to 500 J/kg of dispersing energy is introduced into the catalyst-containing system in from >0 to 60 s. The step (c1) is preferably the above-described step of addition of the catalyst according to the invention. It has been found to be advantageous for the phase of lower mixing energy input to be followed by a phase of greater mixing energy input. In particular, it has been found that the residual content of monomer in the polycarbonate could be reduced further by means of this process procedure. Despite the step (c2), the organic and aqueous phases can surprisingly be separated readily.

In step (c2), from 50 to 500 J/kg, preferably from 100 to 400 J/kg, particularly preferably from 200 to 380 J/kg, of dispersing energy is introduced into the system. This introduction occurs over a time of from >0 to 60 s, preferably for from 0.5 to 30 s, particularly preferably from 1 to 20 s. The introduction of the dispersing energy is preferably carried out by the methods which are described in the prior art and are known to those skilled in the art. The introduction of the dispersing energy is very particularly preferably effected by means of a centrifugal pump and/or gear pump.

In this embodiment, particular preference is given to the step (c2) immediately following the step (c1). Preference is likewise given to step (c2) taking place at a time of up to 25 s after step (c1). During this time, the mixture can, for example, be conveyed through a pipe from step (c1) to the step (c2).

According to the invention, a mixture which surprisingly contains a low content of dihydroxydiarylalkane (monomer) is obtained after steps (a) to (c) have been carried out.

This shows that the selectivity and also the yield can be increased by the process of the invention. At the same time, the mixture obtained in this way has a different stage of mixing than mixtures according to the prior art since less emulsifier is present because of the reduced amount of dihydroxydiarylalkane and a different distribution of the organic and aqueous phases thus results. In addition, the distribution of the residual dihydroxydiarylalkane is different than in the prior art since according to the invention the major part is present in the aqueous phase, while in the prior art the major part is present in the organic phase.

The present invention accordingly provides, in a further aspect, a mixture of an organic phase and an aqueous phase comprising polycarbonate and obtained by a process for preparing polycarbonate by the phase interface process, comprising the steps (a) production of a mixture of an organic phase and an aqueous phase, where
the organic phase contains at least phosgene and optionally at least one chain terminator and
the aqueous phase contains at least one dihydroxydiarylalkane, alkali metal hydroxide and optionally at least one chain terminator, (b) reaction of the phosgene with the at least one dihydroxydiarylalkane in the mixture obtained from (a), optionally with addition of at least one chain terminator and/or further alkali metal hydroxide, (c) at least one addition of at least one catalyst, where step (c) is carried out before step (a) and/or after step (b), preferably after step (b), (d) to give a mixture of an organic phase and an aqueous phase, comprising polycarbonate, subsequent to step (b) or, when step (c) is carried out after step (b), subsequent to step (c), characterized in that, immediately after the optionally first addition of the at least one catalyst in step (c), from 0.01 to 20 J/kg of mixing energy is introduced into the system containing at least one catalyst over a time of from 2 to 1200 s.

The process for preparing polycarbonate by the phase interface process preferably corresponds to the above-described process according to the invention. The mixture according to the invention of an organic phase and an aqueous phase preferably contains as yet unreacted starting materials and/or the at least one catalyst.

In a further aspect, the present invention also provides an organic phase which is obtained by (e) separation of the organic phase from the mixture according to the invention obtained in step (d) of an organic phase and an aqueous phase, comprising polycarbonate.

As indicated above, this organic phase which has been separated off comprises surprisingly little residual dihydroxydiarylalkane. This leads to the work-up of the organic phase being able to be carried out particularly efficiently, for example quickly and economically. The organic phase preferably comprises less than 20 mg/kg, particularly preferably less than 15 mg/kg and very particularly preferably less than 13 kg/mg, of the at least one dihydroxydiarylalkane.

The organic phase according to the invention preferably contains from 12 to 22% by weight of polycarbonates having a weight-average molecular weight Mw of greater than 45 000 g/mol, based on the total weight of the organic phase, and preferably from 12 to 40% by weight, particularly preferably from 15 to 30% by weight, of polycarbonates having a weight-average molecular weight Mw of 45 000 g/mol or less, based on the total weight of the organic phase. In the case of higher concentrations, it can be necessary to heat the solutions.

Furthermore, preference is given to the aqueous phase which is separated off from the organic phase according to the invention from the mixture according to the invention of an organic phase and an aqueous phase comprising less than 20 mg/kg, particularly preferably less than 15 mg/kg and very particularly preferably less than 10 kg/mg, of the at least one dihydroxydiarylalkane.

For the separation in step (e), the fully reacted reaction mixture containing at most traces, preferably less than 2 ppm, of chlorocarbonic esters is preferably allowed to settle for phase separation. The aqueous alkaline phase is optionally returned in its entirety or in part as aqueous phase back to the polycarbonate synthesis or else passed to wastewater treatment where solvent and catalyst components are separated off and optionally recirculated to the polycarbonate synthesis. In another variant of the work-up, the organic impurities, in particular solvents and polymer residues, are separated off and, optionally after setting of a particular pH, e.g. by addition of sodium hydroxide, the salt is separated off and can, for example, be passed to chloralkali electrolysis while the aqueous phase is optionally returned to the polycarbonate synthesis.

The organic phase according to the invention containing the polycarbonate can subsequently be purified by alkaline, ionic or catalytic methods in various ways known to those skilled in the art in order to remove the contamination.

The organic phase according to the invention generally still contains, even after one or more settling operations, optionally aided by passages through settling vessels, stirred vessels, coalescers or separators or combinations of these measures, with water optionally being able to be added under appropriate circumstances in one or more separation steps using active or passive mixing elements, proportions of the aqueous alkaline phase as fine droplets or of the catalyst(s). However, these proportions are smaller than in corresponding phases of the prior art. After this rough removal of the alkaline, aqueous phase, the organic phase can be washed one or more times with dilute acids, mineral acids, carboxylic acids, hydroxycarboxylic acids and/or sulfonic acids. Preference is given to aqueous mineral acids, in particular hydrochloric acid, phosphorous acid, phosphoric acid or mixtures of these acids. The concentration of these acids should preferably be in the range from 0.001 to 50% by weight, preferably from 0.01 to 5% by weight. Furthermore, the organic phase can be repeatedly washed with deionized or distilled water. The removal of the dispersed, organic phase, optionally together with parts of the aqueous phase, after the individual washing steps occurs by means of settling vessels, stirred vessels, coalescers or separators or combinations of these measures. Here, the washing water can be introduced between the washing steps, optionally using active or passive mixing elements. Between these washing steps or else after washing, acids can optionally be added, preferably as a solution in the solvent on which the polymer solution is based. Hydrogen chloride gas, phosphoric acid or phosphorous acid are preferably used here and can optionally also be employed as mixtures. The purified polycarbonate solution obtained in this way should preferably contain not more than 5% by weight, preferably less than 1% by weight, very particularly preferably less than 0.5% by weight, of water after the last separation operation.

Polycarbonate can be isolated from this organic phase according to the invention by steps known to those skilled in the art. This polycarbonate preferably has a weight-average molecular weight Mw of 15 000-200 000 g/mol. The average molecular weights indicated in the present patent application are weight averages (Mw) which are determined by gel permeation chromatography (GPC, Waters "Mixed Bed" columns) in methylene chloride as eluent (using BPA homopolycarbonate standard having an Mw of 31 000 g/mol).

According to the invention, the term polycarbonates encompasses both homopolycarbonates and copolycarbonates. In the case of the preparation according to the invention of homopolycarbonates, only one dihydroxydiarylalkane is used in the process of the invention, while in the case of the preparation according to the invention of copolycarbonates, a plurality of dihydroxydiarylalkanes are used.

The process of the invention can be carried out continuously or batchwise, preferably continuously. The reaction per se, preferably step (b), can therefore be carried out in stirred vessels, tube reactors, pump circulation reactors or cascades of stirred vessels or combinations thereof, with it being ensured by use of the abovementioned mixing elements that aqueous and organic phases preferably demix only when the synthesis mixture has reacted completely, i.e. no longer contains any hydrolysable chlorine of phosgene or chlorocarbonic esters. The preferred embodiments according to the invention of the apparatuses for addition of catalyst have been described above.

A further aspect of the invention provides for a use of from 0.01 to 20 J/kg of mixing energy for a time of from 2 to 1200 s in order to distribute at least one catalyst in a system comprising an organic phase and an aqueous phase, wherein the organic phase contains at least phosgene and optionally at least one chain terminator and the aqueous phase contains at least one dihydroxydiarylalkane, alkali metal hydroxide and optionally at least one chain terminator.

As indicated in more detail above, it was surprising that such a small amount of mixing energy leads to an improvement in the process in respect of selectivity, yield and separability of the phases. All above-described preferences apply to the use according to the invention.

Particular preference is given to the use according to the invention being characterized in that the step (c1), in which a mixing energy of from 0.01 to 20 J/kg is introduced over a time of from 2 to 1200 s, is followed by a further step (c2) in which from 50 to 500 J/kg of dispersing energy is introduced into the catalyst-containing system in from >0 to <60 s. Preference is likewise given to the step (c2) immediately following the step (c1).

EXAMPLES

In the following, 2,2'-bis(4-hydroxyphenyl)propane (bisphenol A, BPA) is used as dihydroxydiarylalkane, and the solvent of the organic phase is a mixture of about 50% by weight of methylene chloride and 50% by weight of monochlorobenzene. In all examples, a polycarbonate having a weight-average molecular weight of from 25 000 to 26 000 g/mol, measured by means of GPC (Waters "Mixed Bed" columns in methylene chloride using BPA homopolycarbonate standard having an Mw of 31 000 g/mol), was produced.

The examples were carried out in an experimental laboratory plant. Here, different mixing energies were introduced into the system by the mixing elements indicated. The apparatuses described were in each case connected with one another by means of a 6 mm Teflon tube.

As apparatuses for the individual process steps, the following were used:

The continuous laboratory experiments were carried out in a combination of pumps, optionally a static mixer and optionally stirred reactors. In all experiments, 70.1 g/h of gaseous phosgene were dissolved in a T-piece in 772 g/h of organic solvent (1:1 methylene chloride/chlorobenzene) at −7° C. The amount of solvent was calculated so that a 15% by weight polycarbonate solution was obtained at the end. The continuously introduced phosgene solution was brought into contact in a further T-piece with 912 g/h of 15% by weight aqueous, alkaline BPA solution (2 mol of NaOH per mol of BPA) which had been preheated to 30° C. This BPA solution was dispersed through a stainless steel filter into the phosgene solution (pore size of 60 μm, process step a)).

The reaction mixture was conveyed into a Fink HMR040 mixing pump which was maintained at 25° C. until the phosgene had reacted completely at the end of the reaction pump. After this pump, 3.29 g/h of p-tert-butylphenol as chain terminator were introduced as 3% strength by weight solution in the same solvent mixture as above, and this reaction mixture was allowed to react further with 53.95 g/h of 32% strength by weight sodium hydroxide solution at 25° C. in a further HMR040 pump so that the pH at the end of the reaction system was about 11.5 (process step b)).

As standard procedure, at least 2 gear pumps from Ismatec (Idex micropump, specific mixing energy about 75 J/Kg per pump) always followed one another, followed again by introduction of 0.679 g/h of the catalyst (10% by weight N-ethylpiperidine, dissolved in chlorobenzene) in a T-piece in the Teflon tube. Downstream of this Teflon tube, the mixing elements indicated in Table 1 followed in the order indicated. This means that, for example, a static mixer or a stirred vessel can follow (process step c1)). In the comparative examples, only the above-described gear pump followed (see Table 1). In some examples, the indicated mixing elements of process step c1) were followed by further mixing elements in the order indicated in Table 1 (process step c2)), In some experiments, a static mixer made of glass with stainless steel internals, which had a residence time of 25 seconds and a pressure drop of about 50 mbar (specific mixing energy of about 5 J/kg), was used in process step c) (see Table 1).

In other experiments, a stirred vessel which was made of glass with a residence time of 600 seconds and baffles made of stainless steel in various places and was operated in the overflow mode was used in process step c) (see Table 1). This stirred vessel was provided with a standard IKA laboratory stirrer (specific mixing energy of about 2.5 J/kg).

Overall, 156 g of polycarbonate in organic solution were obtained continuously, transferred together with the aqueous phase from the reaction to a phase separation vessel in order to separate these phases. The polycarbonate solution was washed with 10% by weight HCl and dried under atmospheric pressure at room temperature in order not to vaporize residual monomers. The aqueous phase from the reaction was analysed as such without further work-up.

After the phase separation, the following values were determined. The BPA content both in the organic phase and in the aqueous phase was determined by means of high-performance liquid chromatography in acetonitrile/water. A Zorbax SB18 4.6*50 mm, 3.5 μm column was used here.

TABLE 1

| | Process step (c1) | Process step (c2) | Phosgene excess | NaOH concentration | Total unreacted BPA [mg/kg] | BPA in organic phase [mg/kg] | BPA in aqueous phase [mg/kg] |
|---|---|---|---|---|---|---|---|
| Comparison 1 | Cat - GP | GP | 16.1% | 32% | 131 | 116 | 15 |
| Experiment 1 | Cat - SV | GP | 16.1% | 32% | 7.6 | 2.7 | 4.9 |

TABLE 1-continued

| | Process step (c1) | Process step (c2) | Phosgene excess | NaOH concentration | Total unreacted BPA [mg/kg] | BPA in organic phase [mg/kg] | BPA in aqueous phase [mg/kg] |
|---|---|---|---|---|---|---|---|
| Comparison 2 | Cat - GP | SV - GP | 16.1% | 32% | 58 | 19 | 39 |
| Experiment 2 | Cat - SM | GP - GP | 16.1% | 32% | 23 | 13 | 10 |
| Comparison 3 | Cat - GP | GP | 16.1% | 15% | 22 | 4 | 18 |
| Experiment 3 | Cat - SV | GP | 16.1% | 15% | 8.5 | 0.7 | 7.8 |

Explanation of the abbreviations used in the table:
Cat: is the addition of catalyst
-(hyphen): represents the mixing element which directly follows
SV: represents the stirred vessel indicated above
GP: represents the above-described gear pump
SM: represents the above-described static mixer As can be seen from Table 1, the change in the process procedure in which firstly a low mixing energy and then an increased dispersing energy are employed immediately after addition of the catalyst (Experiment 1 to 3) leads to a reduction in the total content of BPA both in the aqueous phase and in the organic phase compared to the reverse order (firstly high dispersing energy, then low mixing energy as shown in Comparison 1 to 3). This shows that the selectivity of the reaction was able to be increased. At the same time, it can also be seen that when less BPA is present in the phases, these are simpler to separate since BPA functions as emulsifier.

What is claimed is:

1. A process for preparing polycarbonate by the phase interface process in the presence of at least one catalyst, the process comprising adding at least one catalyst into a reaction system, wherein immediately after the addition of the at least one catalyst, from 0.01 to 20 J/kg of mixing energy is introduced into the system comprising the at least one catalyst within a time of from 2 to 1200 s.

2. The process according to claim 1, wherein the from 0.01 to 20 J/kg of mixing energy is introduced into the catalyst-comprising system by means of at least one static mixer and/or at least one dynamic mixer.

3. The process according to claim 1, wherein the process is operated continuously.

4. The process according to claim 1, wherein the at least one catalyst is selected from the group consisting of a tertiary amine and an organophosphine.

5. The process according to claim 1, wherein the process comprises the steps:
    (a) production of a mixture of an organic phase and an aqueous phase,
        wherein the organic phase comprises at least phosgene and optionally at least one chain terminator, and
        wherein the aqueous phase comprises at least one dihydroxydiarylalkane, alkali metal hydroxide and optionally at least one chain terminator,
    (b) reaction of the phosgene with the at least one dihydroxydiarylalkane in the mixture obtained from step (a), optionally with addition of at least one chain terminator and/or further alkali metal hydroxide, and
    (c) at least one addition of at least one catalyst,
        wherein step (c) is carried out before step (a) and/or after step (b).

6. The process according to claim 1, wherein a step (c1) in which a mixing energy of from >0.01 to 20 J/kg is introduced over a time of from 2 to not more than 1200 s is followed by a further step (c2) in which from 50 to 500 J/kg of dispersing energy is introduced into the catalyst-comprising system in from >0 to 60 s.

7. The process according to claim 6, wherein the step (c2) immediately follows step (c1).

8. The process according to claim 5, wherein in step (a), the excess of phosgene over the at least one dihydroxydiarylalkane is from 3 to 20 mol %.

9. The process according to claim 1, wherein the at least one catalyst is added in the form of a solution in the optionally first addition.

10. The process according to claim 1, wherein the temperature immediately after the optionally first addition of the at least one catalyst is from 35 to 45° C.

11. A mixture of an organic phase and an aqueous phase, comprising polycarbonate, obtained by a process for preparing polycarbonate by the phase interface process, comprising the steps
    (a) production of a mixture of an organic phase and an aqueous phase,
        wherein the organic phase comprises at least phosgene and optionally at least one chain terminator and
        wherein the aqueous phase comprises at least one dihydroxydiarylalkane, alkali metal hydroxide and optionally at least one chain terminator,
    (b) reaction of the phosgene with the at least one dihydroxydiarylalkane in the mixture obtained from (a), optionally with addition of at least one chain terminator and/or further alkali metal hydroxide,
    (c) at least one addition of at least one catalyst comprising a first addition, where step (c) is carried out before step (a) and/or after step (b), and
    (d) to give a mixture of an organic phase and an aqueous phase, comprising polycarbonate, subsequent to step (b) or, when step (c) is carried out after step (b), subsequent to step (c),
        wherein, immediately after the first addition of the at least one addition of the at least one catalyst in step (c), from 0.01 to 20 J/kg of mixing energy is introduced into the system comprising at least one catalyst over a time of from 2 to 1200 s.

12. An organic phase obtained by
    (e) separation of the organic phase from the mixture obtained in step (d) of an organic and aqueous phase, comprising polycarbonate, according to claim 11.

13. The organic phase according to claim 12, wherein the organic phase comprises less than 20 mg/kg of the at least one dihydroxydiarylalkane.

14. A process comprising utilizing from 0.01 to 20 J/kg of mixing energy for a time of from 2 to 1200 s in order to distribute at least one catalyst in a system comprising an organic phase and an aqueous phase,
    wherein the organic phase comprises at least phosgene and optionally at least one chain terminator, and
    wherein the aqueous phase comprises at least one dihydroxydiarylalkane, alkali metal hydroxide and optionally at least one chain terminator.

15. The process according to claim 13, wherein a step (c1), in which a mixing energy of from 0.01 to 20 J/kg is introduced over a time of from 2 to 1200 s, is followed by a further step (c2) in which from 50 to 500 J/kg of dispersing energy is introduced into the catalyst-comprising system in from >0 to <60 s.

* * * * *